(12) United States Patent
Kim et al.

(10) Patent No.: US 8,053,293 B2
(45) Date of Patent: Nov. 8, 2011

(54) METHOD OF MANUFACTURING A DISPLAY SUBSTRATE

(75) Inventors: Bong-Ju Kim, Suwon-si (KR);
Min-Hyuk Choi, Asan-si (KR);
Chun-Gi You, Hwaseong-si (KR);
Young-Il Kim, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 749 days.

(21) Appl. No.: 11/780,952

(22) Filed: Jul. 20, 2007

(65) Prior Publication Data
US 2008/0017855 A1   Jan. 24, 2008

(30) Foreign Application Priority Data
Jul. 21, 2006 (KR) .................. 10-2006-0068265

(51) Int. Cl.
*H01L 21/00* (2006.01)
*H01L 21/84* (2006.01)

(52) U.S. Cl. .... 438/158; 438/18; 438/151; 257/E21.521

(58) Field of Classification Search .................. 438/14, 438/17, 18, 151, 158; 257/E21.521, E21.535; 349/192
See application file for complete search history.

(56) References Cited

U.S. PATENT DOCUMENTS

| 5,213,676 A * | 5/1993 | Reele et al. ............. 205/118 |
| 6,734,925 B1 | 5/2004 | Lee et al. |
| 6,930,744 B1 | 8/2005 | Ukita |
| 2003/0117536 A1 | 6/2003 | Jeon |
| 2005/0258769 A1 | 11/2005 | Imamura |

OTHER PUBLICATIONS

European Search Report—EP-07-01-3186; Date of Search Nov. 27, 2007.

* cited by examiner

*Primary Examiner* — Shouxiang Hu
(74) *Attorney, Agent, or Firm* — F. Chau & Associates, LLC

(57) ABSTRACT

A display substrate includes a pixel, a signal transmission line, a first insulating layer and a test signal input part. The pixel is on an insulating substrate. The signal transmission line is on the insulating substrate to transmit an image signal. The first insulating layer is on the signal transmission line. The first insulating layer has a contact hole through which the signal transmission line is partially exposed. The test signal input part is on the first insulating layer, and includes an extended portion and a test signal pad. The extended portion is electrically connected to the signal transmission line through the contact hole, and is extended toward a side of the insulating substrate. The test signal pad is electrically connected to the extended portion. Therefore, the number of defects is decreased.

7 Claims, 18 Drawing Sheets

METHOD OF MANUFACTURING A DISPLAY SUBSTRATE

CROSS-REFERENCE TO RELATED APPLICATIONS

The present application claims priority to Korean Patent Application No. 10-2006-0068265, filed on Jul. 21, 2006, the disclosure of which is hereby incorporated by reference in its entirety.

BACKGROUND OF THE INVENTION

1. Technical Field

The present disclosure relates to a display substrate, and more particularly, to a display substrate, a method of manufacturing the display substrate and a display device having the display substrate.

2. Discussion of the Related Art

A flat-panel display device has various characteristics such as being thin, light weight, and consuming low power, etc. Flat-panel displays are used in various fields.

The flat-panel display device, in general, includes a display substrate having a plurality of switching elements and a plurality of lines transmitting signals to the switching elements.

The display substrate is formed through a plurality of thin film deposition processes and a plurality of photolithography processes. After the thin film deposition processes and the photolithography processes are completed, the display substrate is tested for potential defects. However, because the lines have a small width, test signals are not applied directly to the lines. Rather, the lines are electrically connected to conductive patterns through which the test signals are applied. However, the conductive patterns may act to inadvertently conduct static charge during subsequent processing steps. The static charge may deteriorate the switching elements and the lines. Accordingly, defects may be formed within the display.

SUMMARY OF THE INVENTION

Exemplary embodiments of the present invention provide a display substrate capable of decreasing defects.

Exemplary embodiments of the present invention also provide a method of manufacturing the above-mentioned display substrate.

Exemplary embodiments of the present invention also provide a display device having the above-mentioned display substrate.

A display substrate in accordance with an exemplary embodiment of the present invention includes a pixel, a signal transmission line, a first insulating layer and a test signal input part. The pixel is on an insulating substrate. The signal transmission line is on the insulating substrate and transmits an image signal. The first insulating layer is on the signal transmission line. The first insulating layer has a contact hole through which the signal transmission line is partially exposed. The test signal input part is on the first insulating layer, and includes an extended portion and a test signal pad. The extended portion is electrically connected to the signal transmission line through the contact hole, and is extended toward a side of the insulating substrate. The test signal pad is electrically connected to the extended portion.

A method of manufacturing a display substrate in accordance with another exemplary embodiment of the present invention includes a signal transmission line that transmits an image signal to a switching element. The signal transmission line is formed on an insulating substrate. A first insulating layer is formed on the insulating substrate and covers the signal transmission line. The first insulating layer has a contact hole through which the signal transmission line is partially exposed. An extended portion is electrically connected to the signal transmission line through the contact hole. A test signal pad is formed on the first insulating layer. The extended portion is extended toward the insulating substrate. The test signal pad is electrically connected to the extended portion. A test signal is applied to the test signal pad to test the switching element and the signal transmission line. The test signal pad is disconnected from the signal transmission line by irradiating the extended portion adjacent to the test signal pad with a laser beam.

A display device in accordance with still another exemplary embodiment of the present invention includes a display substrate, an opposite substrate and a liquid crystal layer. The display substrate includes a pixel, a signal transmission line, a first insulating layer and a test signal input part. The pixel is on an insulating substrate and displays an image. The signal transmission line is on the insulating substrate and transmits an image signal. The first insulating layer is on the signal transmission line, and has a contact hole through which the signal transmission line is partially exposed. The test signal input part is on the first insulating layer. The test signal input part includes an extended portion electrically connected to the signal transmission line through the contact hole and a test signal pad adjacent to the extended portion. The extended portion is extended toward the signal transmission line. The test signal pad is electrically insulated from the signal transmission line. The opposite substrate faces the display substrate. The liquid crystal layer is interposed between the display substrate and the opposite substrate.

The test signal input part is formed on the gate insulating layer and may be easily disconnected by laser trimming, thereby protecting the display substrate from an externally provided static charge.

BRIEF DESCRIPTION OF THE DRAWINGS

The above and other features of the present disclosure will become more apparent by describing in detail example embodiments thereof with reference to the accompanying drawings, in which.

DETAILED DESCRIPTION OF THE EXEMPLARY EMBODIMENTS

Figure 1:
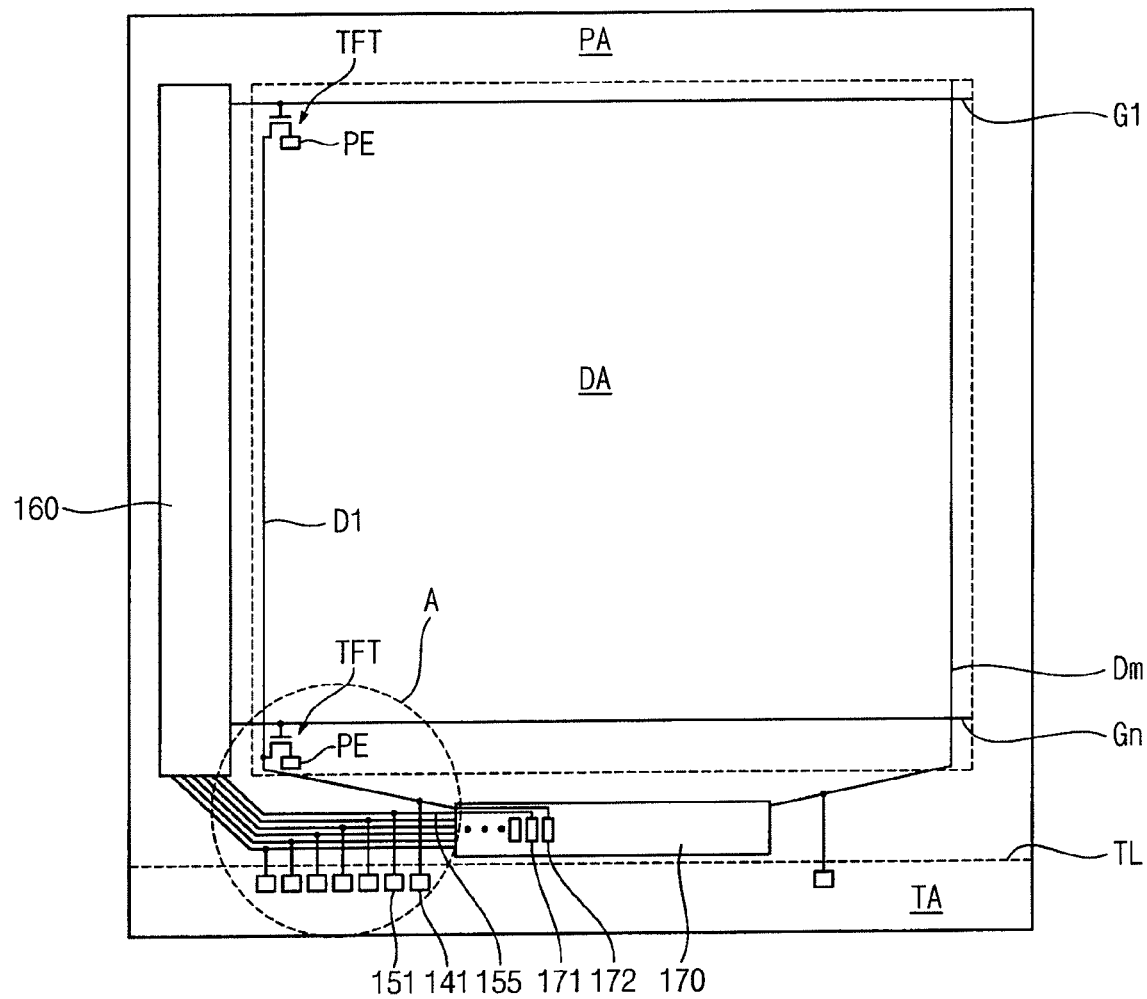
FIG. 1 is a plan view illustrating a display substrate in accordance with an exemplary embodiment of the present invention.

Exemplary embodiments of the invention are described more fully hereinafter with reference to the accompanying drawings. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. Like numbers refer to like elements throughout. As used herein, the term "and/or" includes any and all combinations of one or more of the associated listed items.

Exemplary embodiments of the present invention are described in more detail below with reference to the accompanying drawings.

Figure 2:
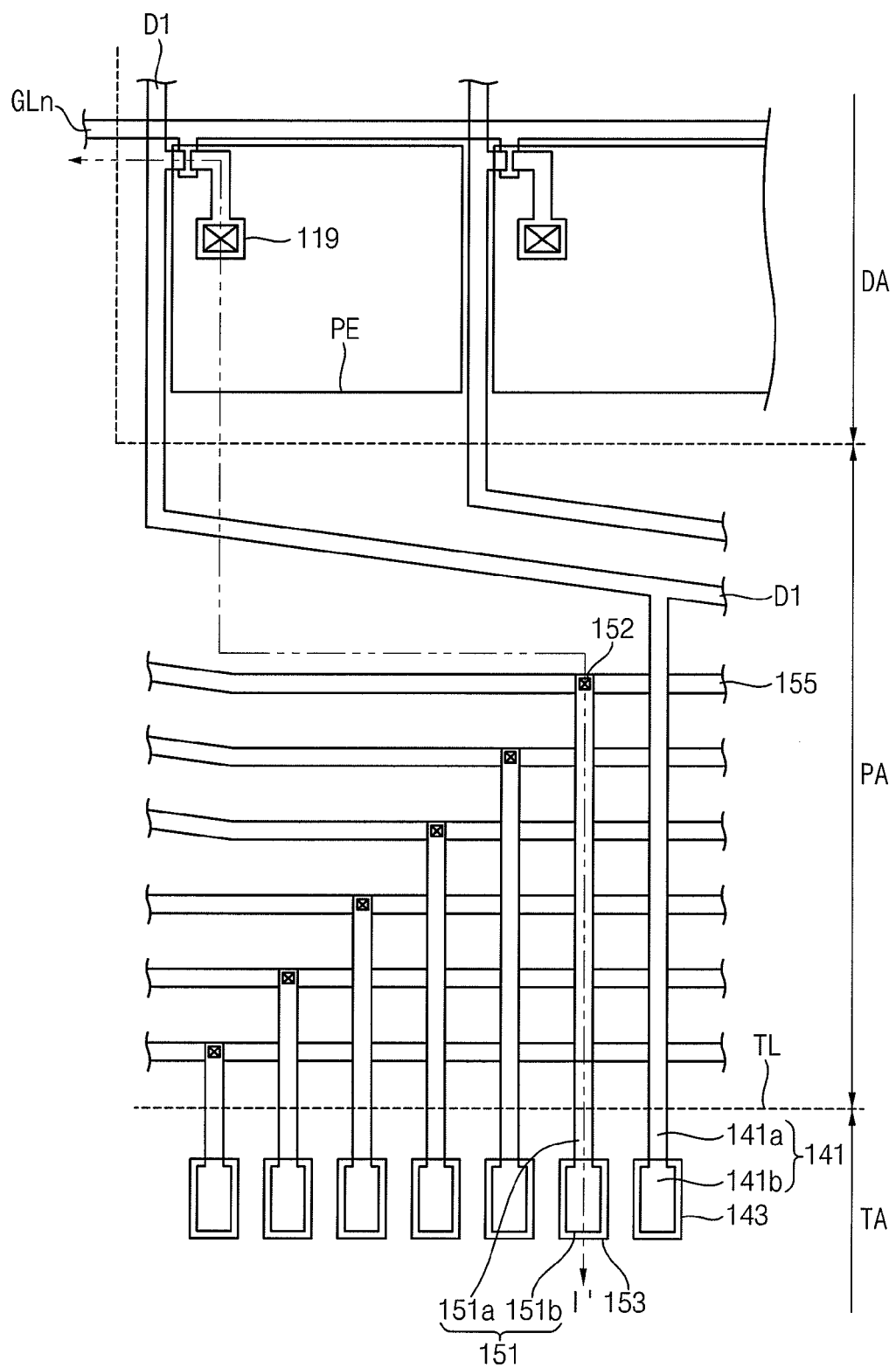
FIG. 2 is an enlarged plan view illustrating a portion 'A' shown in FIG. 1.
Figure 3:
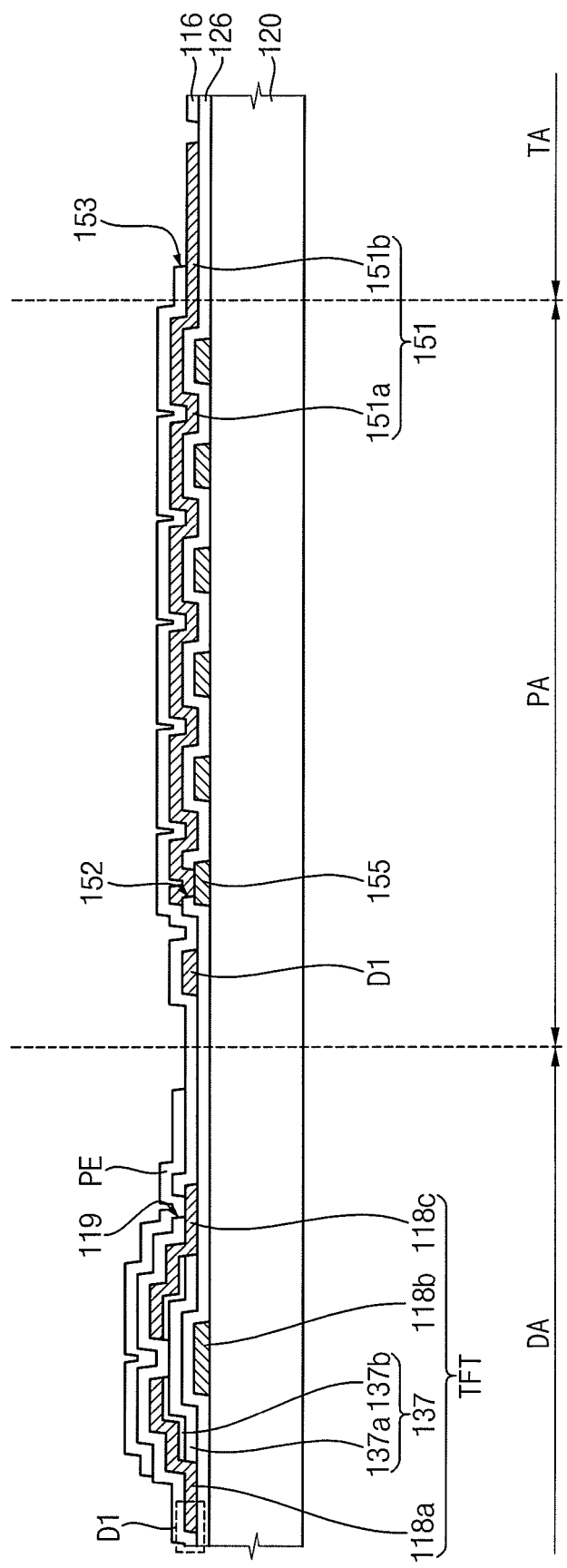
FIG. 3 is a cross-sectional view taken along a line I-I' shown in FIG. 2.

FIG. 1 is a plan view illustrating a display substrate in accordance with an exemplary embodiment of the present invention. FIG. 2 is an enlarged plan view illustrating a portion 'A' shown in FIG. 1. FIG. 3 is a cross-sectional view taken along a line I-I' shown in FIG. 2.

Referring to FIG. 1, the display substrate includes an insulating substrate. A pixel region DA, a peripheral region PA and a test pad region TA are defined on the display substrate. An image is displayed in the pixel region DA. The peripheral region PA surrounds the pixel region DA. A test signal is applied to the test pad region TA. The test pad region TA is adjacent to the peripheral region PA, and is adjacent to a side of the display substrate. A trimming line TL is interposed between the peripheral region PA and the test pad region TA. The trimming line TL is irradiated with a laser.

The insulating substrate includes glass that transmits light. The glass of the insulating substrate may be free of alkaline ions. When the insulating substrate includes the alkaline ions, the alkaline ions may dissolve in a liquid crystal layer (not shown) thereby decreasing resistivity of the liquid crystal layer, decreasing an image display quality, and decreasing an adhesive strength between a sealant (not shown) and the insulating substrate. In addition, characteristics of a thin film transistor TFT may be deteriorated.

The insulating substrate may also include a high polymer that is optically transparent. Examples of the optically transparent high polymer that can be used for the insulating substrate include triacetylcellulose (TAC), polycarbonate (PC), polyethersulfone (PES), polyethylene terephthalate (PET), polyethylene naphthalate (PEN), polyvinyl alcohol (PVA), polymethyl methacrylate (PMMA), cyclo-olefin polymer (COP), etc. These optically transparent high polymers can be used alone or in any combination.

The insulating substrate may be optically isotropic. Alternatively, the insulating substrate may be optically anisotropic.

A plurality of gate lines G1, . . . , Gn, a plurality of data lines D1, . . . , Dm and a plurality of pixels are formed in the pixel region DA. The data lines D1, . . . , Dm are extended in a direction crossing an extended direction of the gate lines G1, . . . , Gn. The pixels are defined by the gate lines G1, . . . , Gn and the data lines D1, . . . , Dm, and are arranged in a matrix. The gate lines G1, . . . , Gn, the data lines D1, . . . , Dm and the pixels are formed on the insulating substrate.

Each of the pixels includes the thin film transistor TFT and a pixel electrode PE electrically connected to one of the gate lines G1, . . . , Gn and one of the data lines D1, . . . , Dm. The pixel electrode PE is electrically connected to the thin film transistor TFT. The thin film transistor TFT functions as a switching element. Each of the pixels may further include a storage capacitor (not shown) that maintains a voltage difference between the pixel electrode PE and a common electrode (not shown).

A gate driving part 160, a portion of a first extended portion 151a of a first test signal input part 151, a portion of a second extended portion 141a of a second test signal input part 141, a signal transmission line 155 and an integrated pad part 170 are formed in the peripheral region PA. Alternatively, portions of a plurality of first extended portions of a plurality of first test signal input parts, portions of a plurality of second extended portions of a plurality of second test signal input parts, and a plurality of signal transmission lines may be formed in the peripheral region PA. In FIGS. 1 to 3, the gate driving part 160 is spaced apart from the test pad region TA, and is adjacent to the side of the display substrate.

The gate driving part 160 receives a plurality of gate driving signals from the integrated pad part 170 and the signal transmission lines 155 and applies a plurality of gate signals to the gate lines G1, . . . , Gn. For example, the gate driving part 160 includes a shift register, and the gate driving signals include a common voltage Vcom, a start signal STV, a first clock signal Vck, a second clock signal Vckb, a first driving voltage Von and a second driving voltage Voff. The gate driving part 160 may be directly formed on the display substrate. The gate driving part 160 may include a chip or a flexible circuit board.

Referring to FIGS. 2 and 3, the thin film transistor TFT, the first test signal input part 151, the second test signal input part 141 and the signal transmission line 155 are formed on the insulating substrate 120.

The thin film transistor TFT includes a gate electrode 118b, a gate insulating layer 126, a semiconductor pattern 137, a source electrode 118a and a drain electrode 118c.

The gate electrode 118b is on the insulating substrate 120, and is electrically connected to one of the gate lines G1, . . . , Gn.

The gate insulating layer 126 covers the gate electrode 118b and the gate lines G1, . . . , Gn so that the gate electrode 118b and the gate lines G1, . . . , Gn are electrically insulated from the semiconductor pattern 137, the source electrode 118a and the drain electrode 118c. For example, the gate insulating layer 126 includes an insulating material. Examples of the insulating material that can be used for the gate insulating layer 126 include silicon nitride, silicon oxide, etc.

The semiconductor pattern 137 includes an amorphous silicon pattern 137a and an n+ amorphous silicon pattern 137b. The amorphous silicon pattern 137a is on the gate insulating layer 126 corresponding to the gate electrode 118b. The n+ amorphous silicon pattern 137b includes two patterns spaced apart from each other on the amorphous silicon pattern 137a.

The source electrode 118a is on a first pattern of the n+ amorphous silicon pattern 137b. The source electrode 118a is electrically connected to one of the data lines D1, . . . , Dm.

The drain electrode 118c is on a second pattern of the n+ amorphous silicon pattern 137b. The drain electrode 118c is electrically connected to a pixel electrode PE.

A passivation layer 116 is formed on the semiconductor pattern 137, the source electrode 118a and the drain electrode 118c. The passivation layer 116 has a first contact hole 119 through which the drain electrode 118c is partially exposed. The drain electrode 118c is electrically connected to the pixel electrode PE through the first contact hole 119. The passivation layer 116 includes an insulating material that transmits light. Examples of the insulating material that can be used for the passivation layer 116 include silicon nitride, silicon oxide, etc. An organic insulating layer (not shown), a color filter, etc., may also be formed on the passivation layer 116.

The pixel electrode PE is electrically connected to the drain electrode 118c through the first contact hole 119. For example, the pixel electrode PE includes a transparent conductive material. Examples of the transparent conductive material that can be used for the pixel electrode PE include indium tin oxide (ITO), indium zinc oxide (IZO), etc.

For example, the signal transmission line 155 is formed from substantially the same layer as the gate electrode 118b, and is interposed between the insulating substrate 120 and the gate insulating layer 126. There may be substantially the same number of signal transmission lines 155 as there are gate driving signals.

The first test signal input part 151 is formed from substantially the same layer as the data lines D1, ..., Dm. The first test signal input part 151 is interposed between the gate insulating layer 126 and the passivation layer 116. The first test signal input part 151 includes a first extended portion 151a and a first test signal pad 151b that is electrically connected to the first extended portion 151a.

The first extended portion 151a is in the peripheral region PA adjacent to the test pad region TA. The first extended portion 151a is electrically connected to each of the signal transmission lines 155 through a second contact hole 152 that is formed through the gate insulating layer 126. The first extended portion 151a is extended toward the test pad region TA of the display substrate across the trimming line TL. In FIGS. 1 to 3, the first extended portion 151a has a substantially linear shape. Alternatively, the first extended portion 151a may have various shapes such as an L-shape, an S-shape, etc.

The first test signal pad 151b is in the test pad region TA. The passivation layer 116 may further have a third contact hole 153 through which the first test signal pad 151b is substantially entirely exposed. Alternatively, the first test signal pad 151b may be partially exposed through the third contact hole 153.

The second test signal input part 141 is formed from substantially the same layer as the data lines D1, ..., Dm. The second test signal input part 141 is electrically connected to one of the data lines D1, ..., Dm. The second test signal input part 141 is interposed between the gate insulating layer 126 and the passivation layer 116. The second test signal input part 141 includes a second extended portion 141a and a second test signal pad 141b that is electrically connected to the second extended portion 141a.

The second extended portion 141a is in the peripheral region PA adjacent to the test pad region TA. The second extended portion 141a is electrically connected to one of the data lines D1, ... Dm that are formed from substantially the same layer as the second extended portion 141a. The second extended portion 141a is extended toward the test pad region TA of the display substrate across the trimming line TL. In FIGS. 1 to 3, the second extended portion 141a has a substantially linear shape. Alternatively, the second extended portion 141a may have various shapes such as an L-shape, an S-shape, etc.

The second test signal pad 141b is in the test pad region TA. The passivation layer 116 may further have a fourth contact hole 143 through which the second test signal pad 141b is exposed. In FIGS. 1 to 3, the second test signal pad 141b is substantially entirely exposed through the fourth contact hole 143. Alternatively, the second test signal pad 141b may be partially exposed through the fourth contact hole 143.

In order to test the display substrate, a plurality of first test signals is applied to the first test signal input part 151, and a plurality of second test signals is applied to the second test signal input part 141. The first test signals are applied to the gate driving part 160 through the signal transmission lines 155. The second test signals are applied to the data lines D1, ..., Dm. Thus, the pixels are tested. The first test signals correspond to the gate driving signals, and the second test signals correspond to the data signals. Alternatively, substantially the same test signal may be applied to at least two of the data lines D1, ..., Dm.

The integrated pad part 170 includes a plurality of gate pads 171 and a plurality of data pads 172. The gate pads 171 are on the insulating substrate 120, and are electrically connected to the signal transmission lines 155. The gate pads 171 are exposed through a plurality of contact holes (not shown) that is formed through the gate insulating layer 126 and the passivation layer 116. The data pads 172 are on the gate insulating layer 126, and are electrically connected to the data lines D1, ..., Dm. The data pads 172 are exposed through a plurality of contact holes (not shown) that is formed in the passivation layer 116.

A driving chip (not shown) is formed in the integrated pad part 170. The driving chip is electrically connected to the signal transmission line 155 and the data lines D1, ..., Dm through the gate pads 171 and the data pads 172. The gate driving signals and the data signals are transmitted to the display substrate. Alternatively, an integrally formed printed circuit board may be directly formed on the display substrate.

After the display substrate is tested, a laser beam irradiates the display substrate along the trimming line TL so that the first test signal pad 151b and the second test signal pad 141b are electrically disconnected from the signal transmission lines 155 and the data lines D1, Dm.

When the first test signal pad 151b and the second test signal pad 141b are electrically connected to the signal transmission line 155 and the data lines D1, ..., Dm, respectively, the first and second test signal pads 151b and 141b may function as a conduit for receiving static charge during subsequent processes. However, in FIGS. 1 to 3, the first and second test signal pads 151b and 141b are electrically disconnected from the signal transmission lines 155 and the data lines D1, ..., Dm by the trimming process using the laser beam. Thus, the signal transmission line 155 and the data lines D1, ..., Dm may be protected from static charge and deterioration of the data driving part 160 and the pixels may be prevented.

In addition, in FIGS. 1 to 3, the trimming line TL crosses the first and second extended portions 151a and 141a. Therefore, when the display substrate is irradiated by the laser beam along the trimming line TL, the first extended portion 151a and the second extended portion 141a may be easily disconnected from the first and second test signal pads 151b and 141b.

Furthermore, the first and second test signal input parts 151 and 141 are formed from substantially the same layer. Accordingly, the first and second test signal input parts 151 and 141 may be more easily disconnected than test signal input parts formed from substantially the same layer as the gate lines G1, . . . , Gn.

Figure 4:
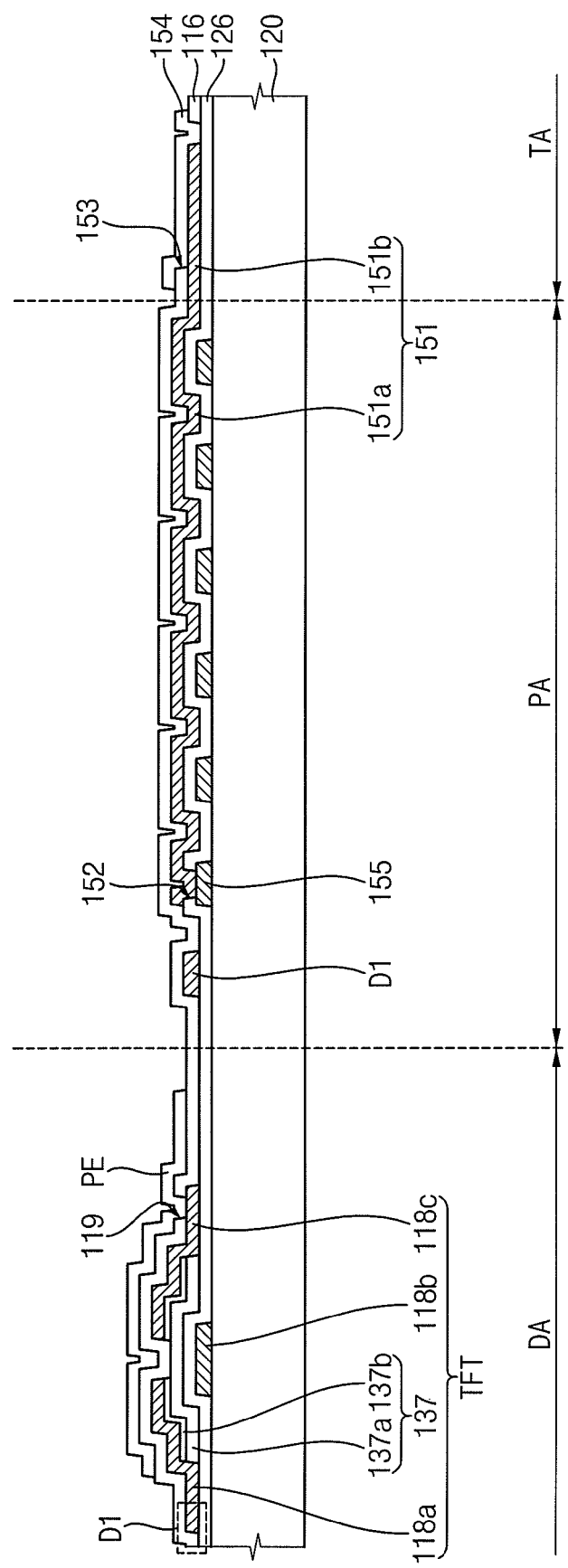
FIG. 4 is a cross-sectional view illustrating a display substrate in accordance with another exemplary embodiment of the present invention.

FIG. 4 is a cross-sectional view illustrating a display substrate in accordance with another exemplary embodiment of the present invention. The display device of FIG. 4 is substantially identical to the display device of FIGS. 1 to 3 except for the addition of a cover pattern in the display device of FIG. 4. Thus, the same reference numerals may be used to refer to the same or like parts as those described in FIGS. 1 to 3.

Referring to FIG. 4, the cover pattern 154 covers a first test signal pad 151b that is exposed through a third contact hole 153. For example, the cover pattern 154 may be formed from substantially the same layer as the pixel electrode PE, and may include a transparent conductive material. The cover pattern 154 may be larger than the first test signal pad 151b.

In addition, an auxiliary cover pattern (not shown) covers a second test signal pad 141b (shown in FIG. 2) that is exposed through a fourth contact hole 143 (shown in FIG. 2). In FIG. 4, the auxiliary cover pattern is formed from substantially the same layer as the cover pattern, and includes substantially the same transparent conductive material as the cover pattern. The auxiliary cover pattern may be larger than the second test signal pad 141b when viewed on a plane.

Therefore, the cover pattern 154 that is larger than the first test signal pad 151b is formed on the first test signal pad 151b. Accordingly, a first test signal is applied to the first test signal pad 151b. In addition, the auxiliary cover pattern that is larger than the second test signal pad 141b is formed on the second test signal pad 141b. Accordingly, a second test signal may be easily applied to the second test signal pad 141b.

Figure 5:
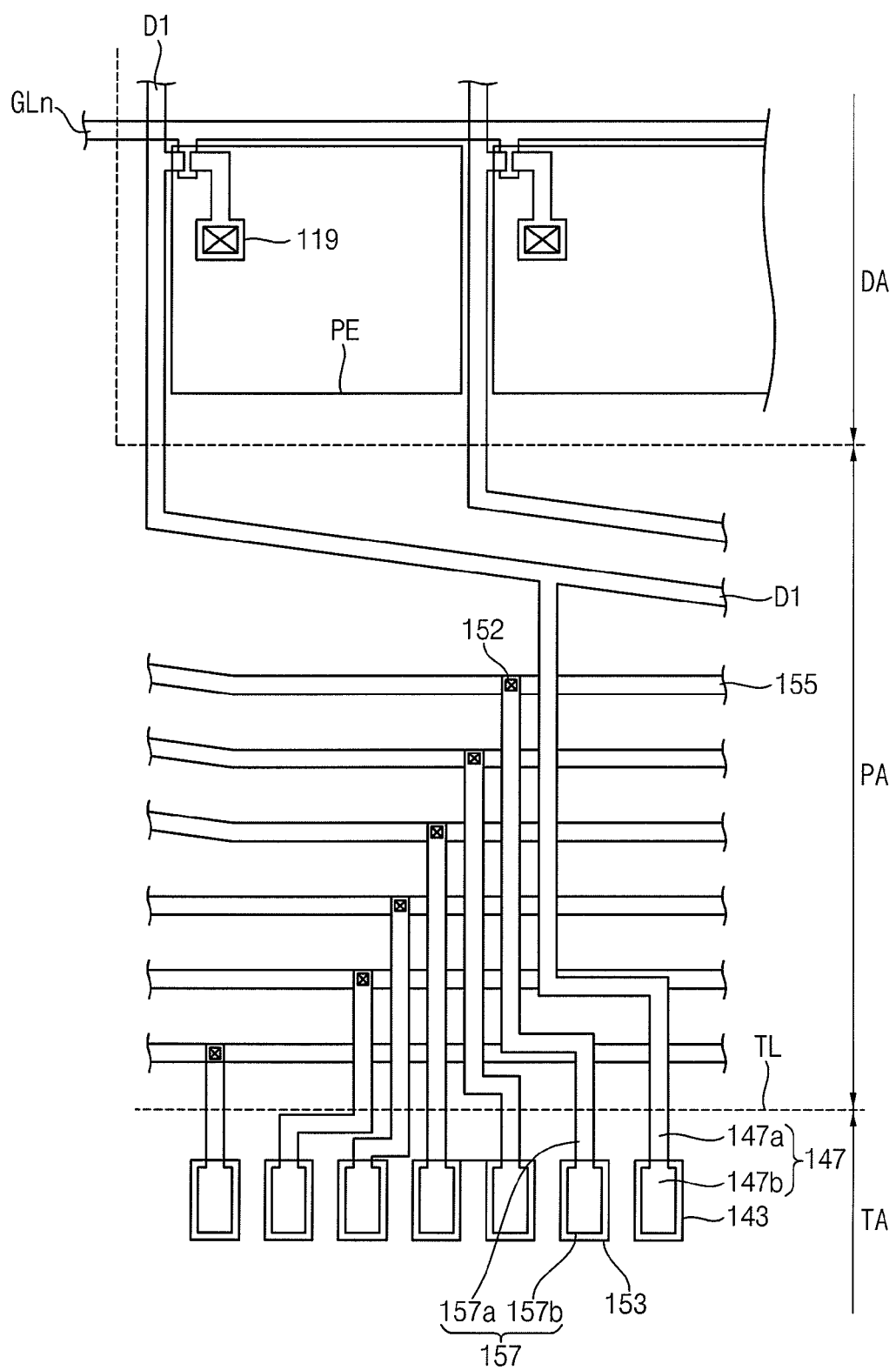
FIG. 5 is a plan view illustrating a display substrate in accordance with another exemplary embodiment of the present invention.

FIG. 5 is a plan view illustrating a display substrate in accordance with another exemplary embodiment of the present invention. The display device of FIG. 5 is substantially identical to the display device of FIGS. 1 to 3 except for differences relating to a first test signal input part and a second test signal input part. Thus, the same reference numerals may be used to refer to the same or like parts as those described in FIGS. 1 to 3.

Referring to FIG. 5, a first test signal input part 157 includes a first extended portion 157a and a first test signal pad 157b. The first extended portion 157a may, for example, have an L-shape.

The second test signal input portion 147 includes a second extended portion 147a and a second test signal pad 147b. The second extended portion 147a may, for example, have an L-shape.

According to the display substrate of FIG. 5, the first and second extended portions 157a and 147a have an L-shape so that the first and second extended portions 157a and 147a are adjacent to each other. In addition, the locations of the first and second extended portions 157a and 147a may be changed. Thus, electromagnetic interference between adjacent conductive lines and the first and second extended portions 157a and 147a may be minimized.

FIGS. 6 to 15 are cross-sectional views illustrating a method of manufacturing a display substrate in accordance with another exemplary embodiment of the present invention.

Figure 6:
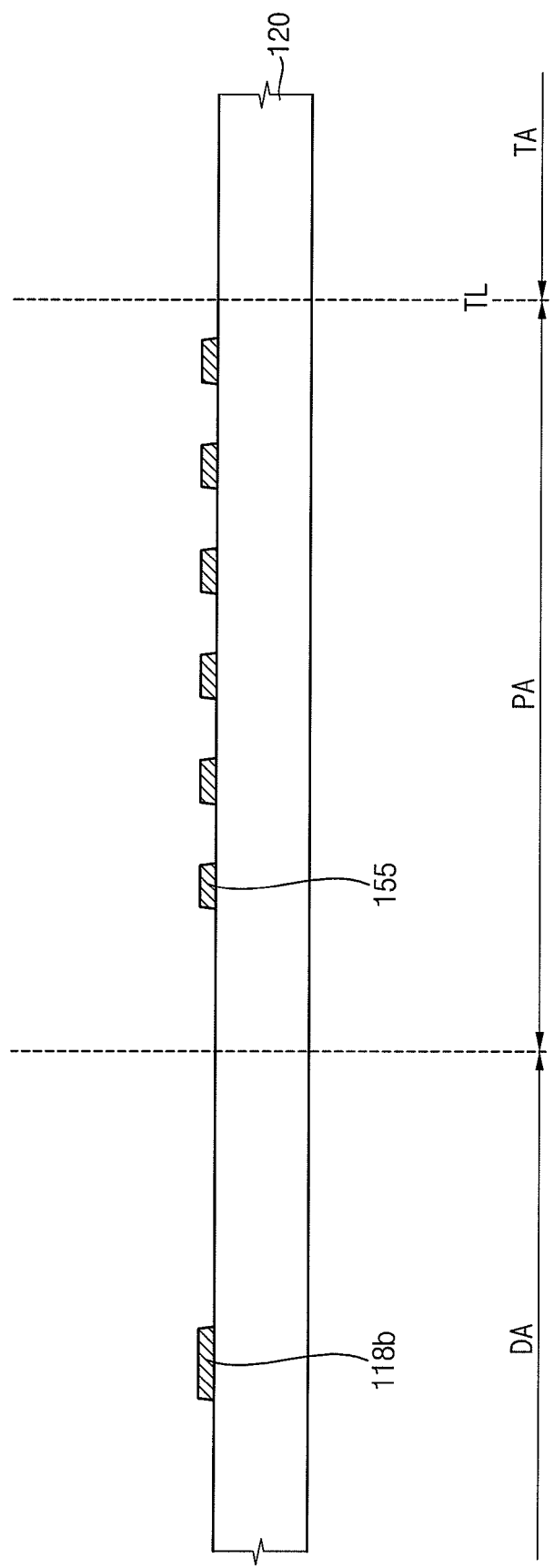
FIGS. 6 to 15 are cross-sectional views illustrating a method of manufacturing a display substrate in accordance with another exemplary embodiment of the present invention.

Referring to FIGS. 1 and 6, a gate metal layer (not shown) is formed on an insulating substrate 120. The gate metal layer may have a single layered structure or a multi-layered structure. For example, the gate metal layer may be a first common layer. The gate metal layer is partially etched through a photolithography process to form a gate electrode 118b, a plurality of gate lines G1, . . . , Gn and a plurality of signal transmission lines 155. The gate electrode 118b and the gate lines G1, . . . , Gn are formed in a pixel region DA, and the signal transmission lines 155 are formed in a peripheral region PA that surrounds the pixel region DA.

Figure 7:
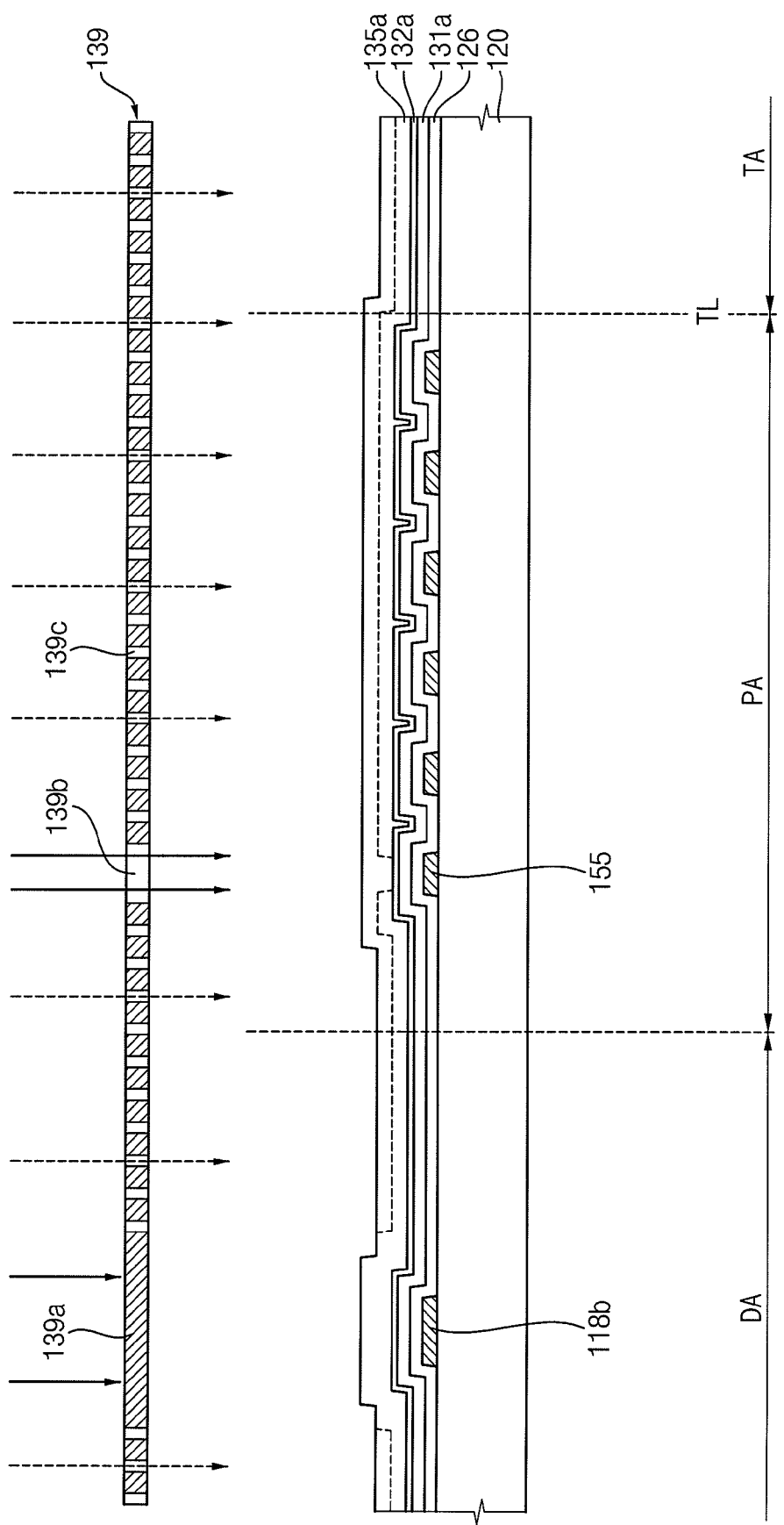

Referring to FIGS. 1 and 7, a gate insulating layer 126 and a primary amorphous silicon layer (not shown) are sequentially formed on the insulating substrate 120 on which the gate electrode 118b and the gate lines G1, . . . , Gn are formed.

N+ ions are implanted into the primary amorphous silicon layer to form an amorphous silicon layer 131a and an N+ amorphous silicon layer 132a. The amorphous silicon layer 131a is formed on the gate insulating layer 126, and the N+ amorphous silicon layer 132a is formed on the amorphous silicon layer 131a.

A photoresist film 135a is formed on the N+ amorphous silicon layer 132a.

A mask 139 is aligned on the photoresist film 135a. The mask 139 includes a light blocking portion 139a, a transparent portion 139b and a translucent portion 139c. The light blocking portion 139a corresponds to a semiconductor pattern 137 (shown in FIG. 3), and blocks light. The transparent portion 139b corresponds to a second contact hole 152 (shown in FIG. 3), and transmits light. The translucent portion 139c corresponds to a remaining portion of the mask 139, and partially transmits light. In FIG. 7, the translucent portion 139c includes a plurality of slits. Alternatively, the translucent portion 139c may include a translucent pattern.

The photoresist film 135a is exposed through the mask 139.

Figure 8:
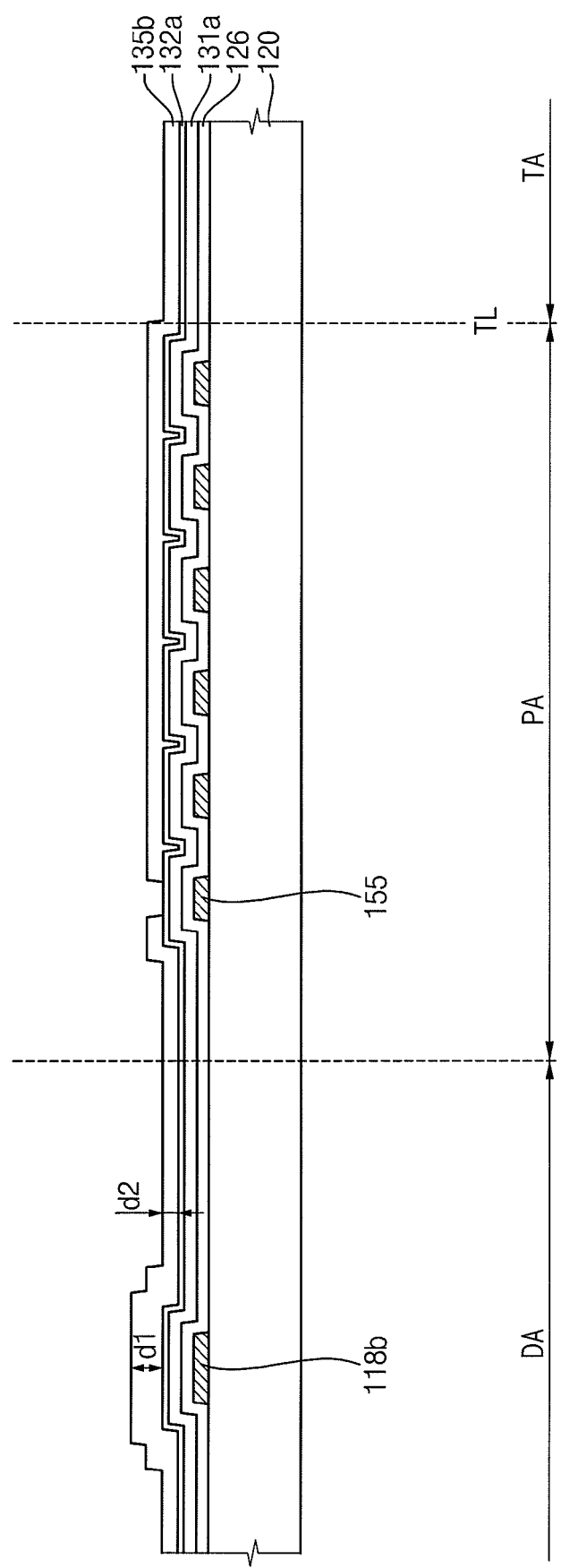

Referring to FIGS. 7 and 8, the exposed photoresist film 135a is developed to form a first photoresist pattern 135b. The photoresist film 135a corresponding to the transparent portion 139b is removed to partially expose the N+ amorphous silicon layer 132a. The photoresist film 135a corresponding to the light blocking portion 139a remains on the N+ amorphous silicon layer 132a and the photoresist film 135a corresponding to the translucent portion 139c is partially removed. A thickness d1 of the photoresist film 135a corresponding to the light blocking portion 139a is greater than a thickness d2 of the photoresist film 135a corresponding to the translucent portion 139c.

Figure 9:
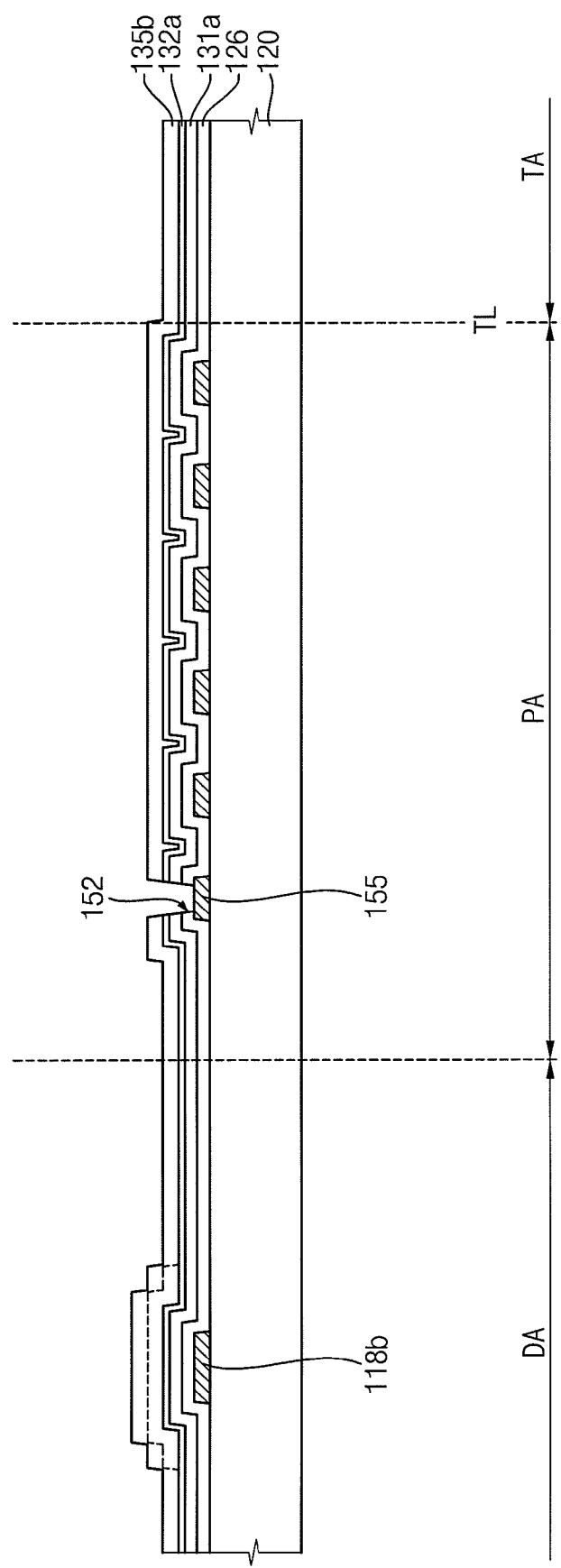

Referring to FIG. 9, the exposed N+ amorphous silicon layer 132a, the amorphous silicon layer 131a and the gate insulating layer 126 are partially removed using the first photoresist pattern 135b as an etching mask to partially expose the signal transmission lines 155.

Figure 10:
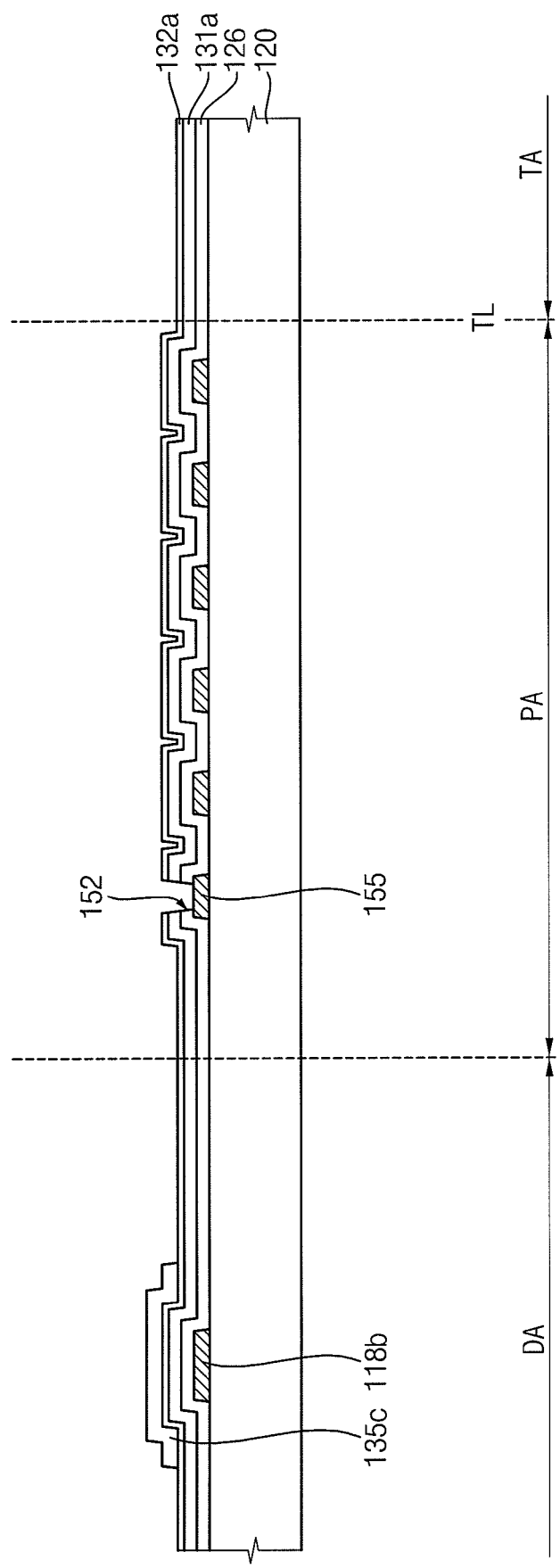

Referring to FIG. 10, the first photoresist pattern 135b is etched so that a thickness of the first photoresist pattern 135b is decreased by a constant amount. The first photoresist pattern 135b corresponding to the translucent portion 139c (shown in FIG. 7) is removed so that the n+ amorphous silicon layer 132a corresponding to the translucent portion 139c is exposed. Thus, a second photoresist pattern 135c corresponding to the semiconductor pattern 137 (shown in FIG. 3) is formed.

Figure 11:
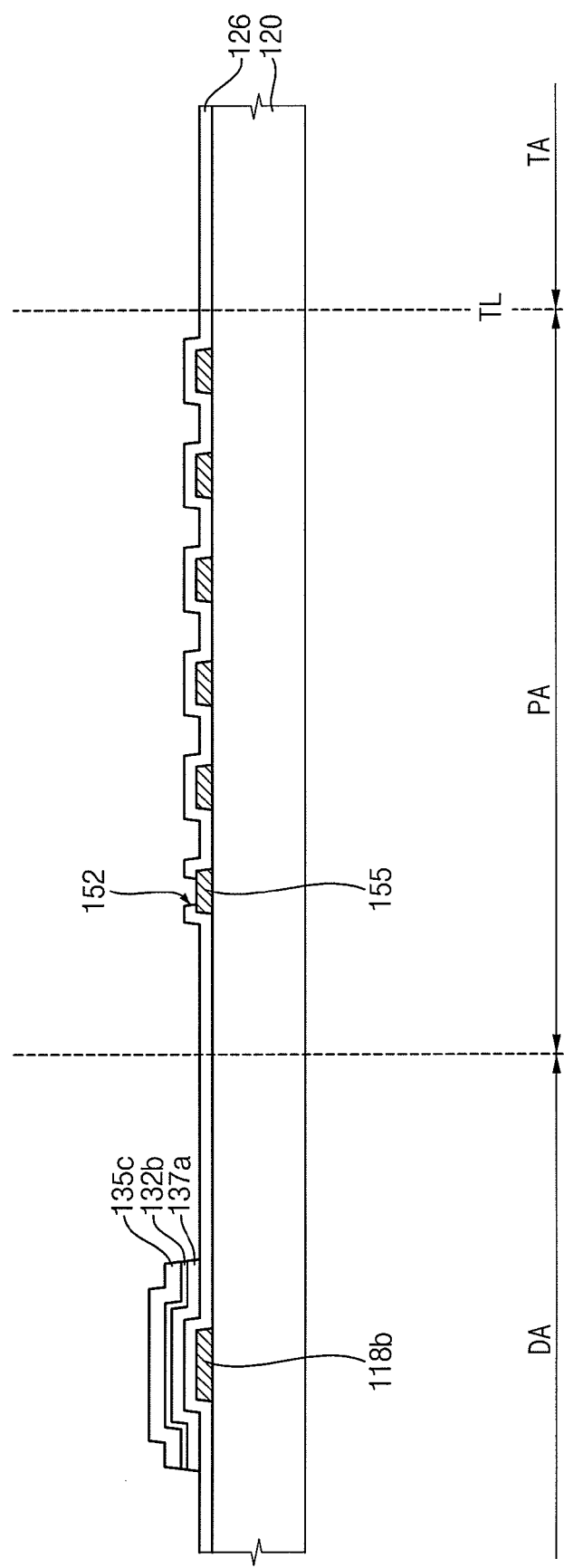

Referring to FIG. 11, the N+ amorphous silicon layer 132a and the amorphous silicon layer 131a exposed through the second photoresist pattern 135c are partially removed using the second photoresist pattern 135c as an etching mask to form an amorphous silicon pattern 137a and a primary N+ amorphous silicon pattern 132b that is on the amorphous silicon pattern 137a.

Figure 12:
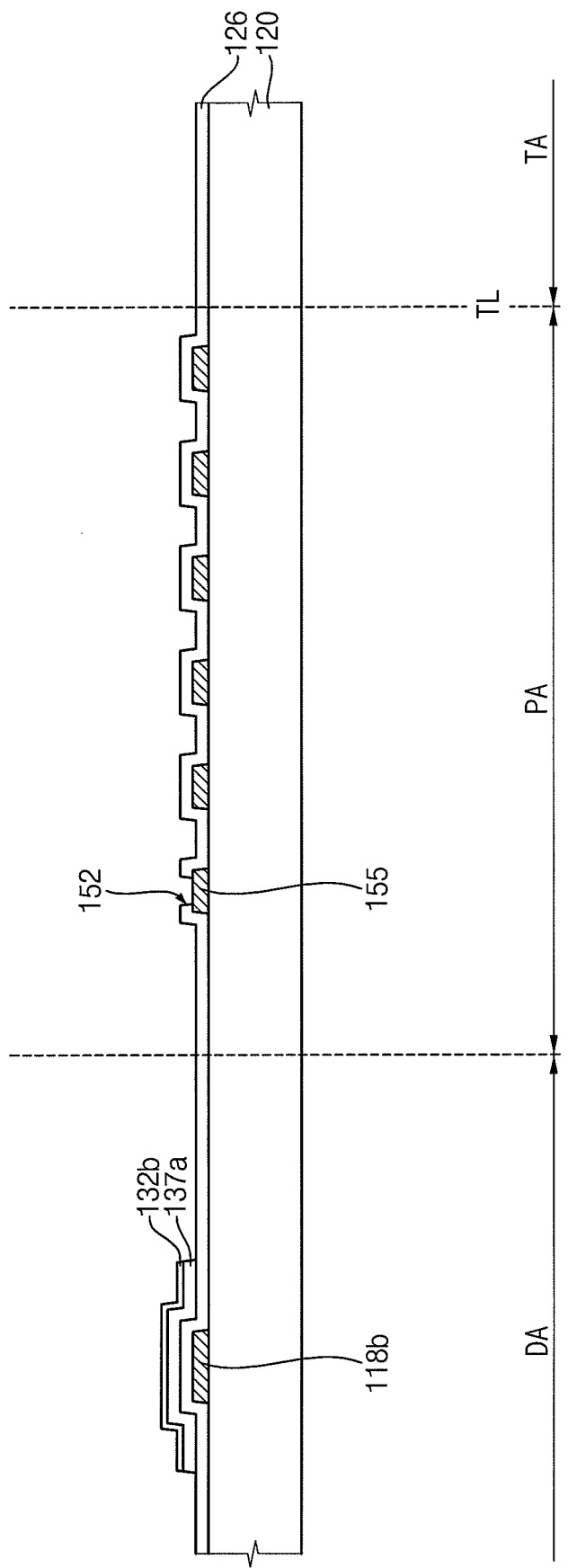

Referring to FIG. 12, the second photoresist pattern 135c is removed so that the primary N+ amorphous silicon pattern 132b is exposed.

Figure 13:
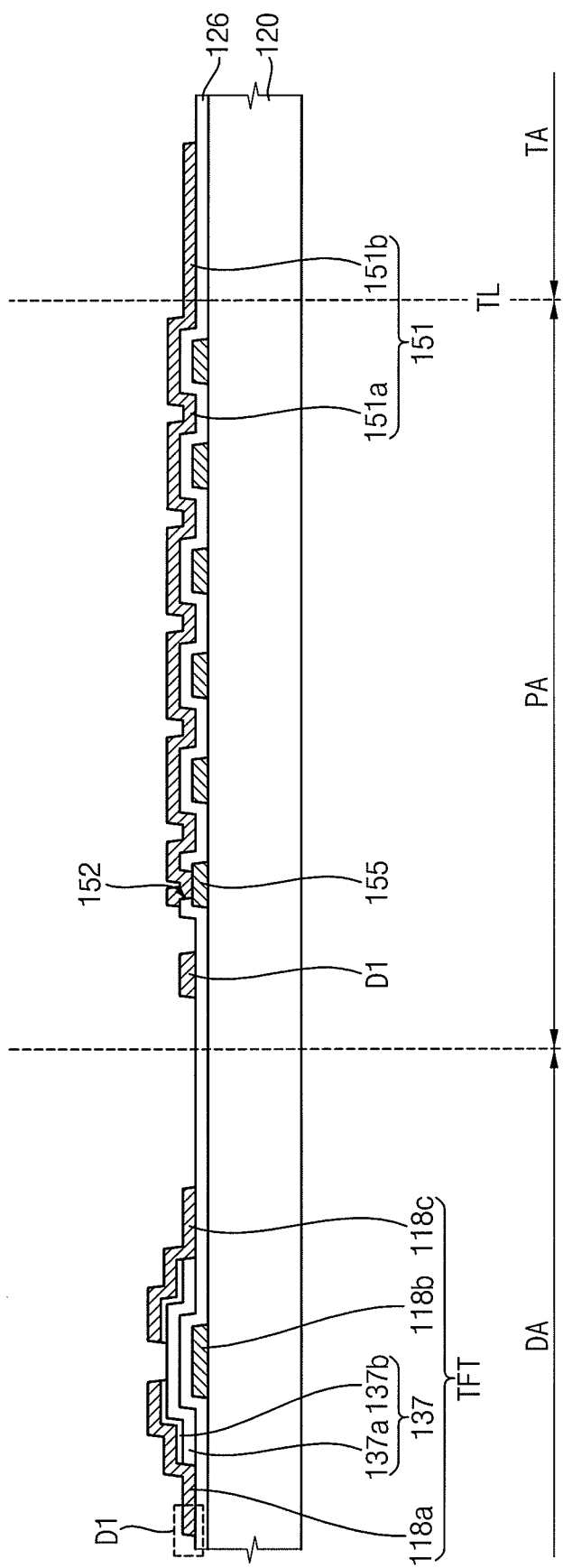

Referring to FIGS. 1 and 13, a data metal layer (not shown) is formed on a gate insulating layer 126 on which the amorphous silicon pattern 137a, the N+ amorphous silicon pattern 132b and the second contact hole 152 are formed. For example, the data metal layer may be a second common layer.

The data metal layer is partially etched to form a plurality of data lines D1, . . . , Dm, a source electrode 118a, a drain electrode 118c, a first test signal input part 151 and a second test signal input part 141 through a photolithography process. The first test signal input part 151 is electrically connected to the signal transmission line 155 through a second contact hole 152. The second test signal input part 141 is electrically connected to each of the data lines D1, . . . , Dm.

Figure 14:
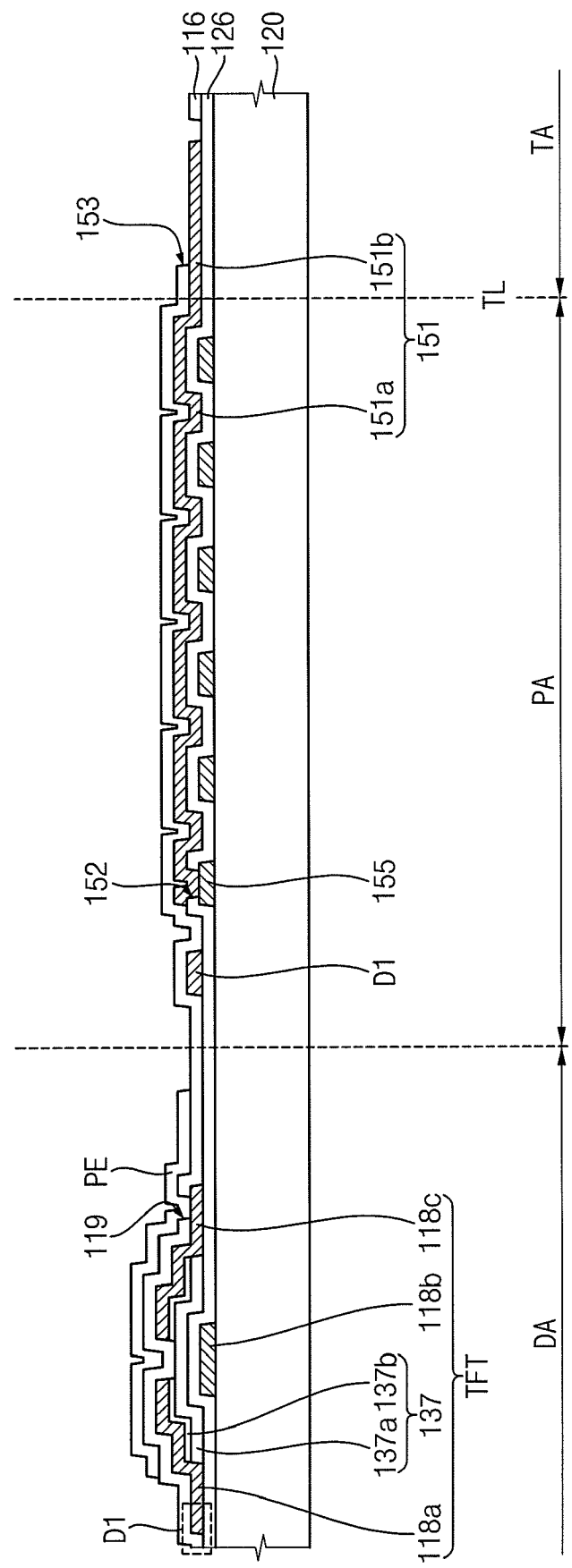

Referring to FIGS. 1 and 14, a passivation layer 116 is formed on the gate insulating layer 126 on which the data lines D1, . . . , Dm, the source electrode 118a, the drain electrode 118c, the first test signal input part 151 and the second test signal input part 141 are formed. The passivation layer 116 is partially etched to form a third contact hole 153 through which the first test signal pad 151b is exposed and a fourth contact hole 143 through which the second test signal pad 141b is exposed.

Figure 15:
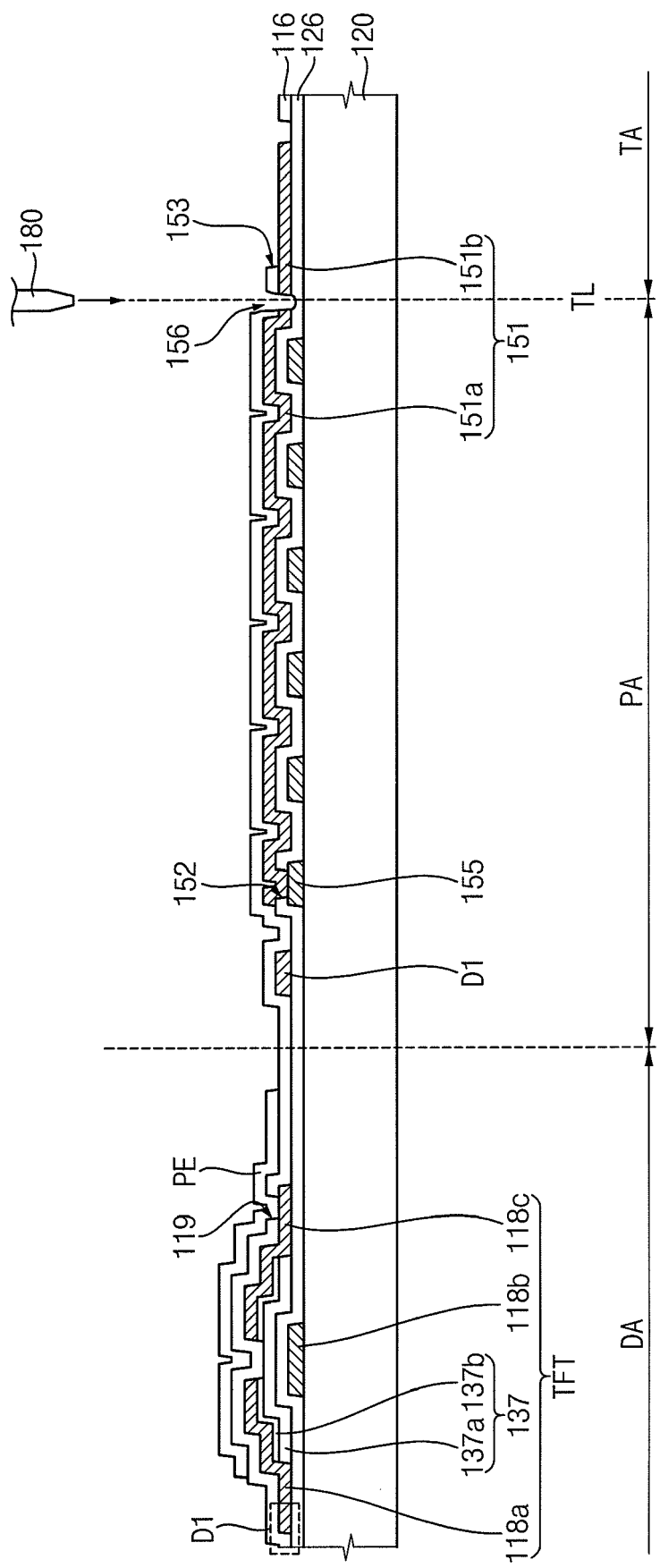

Referring to FIGS. 1 and 15, the display substrate is irradiated along the trimming line TL by a trimming laser 180 to form a disconnecting portion 156. For example, the disconnecting portion 156 includes a groove. A depth of the groove of the disconnecting portion 156 may be greater than a combined thickness of the passivation layer 116 and the first extended portion 151a and may be smaller than a combined thickness of the passivation layer 116, the first extended portion 151a and the gate insulating layer 126. For example, a bottom of the disconnecting portion 156 may be formed in the gate insulating layer 126.

Therefore, the first extended portion 151a and the second extended portion 141a are disconnected from the first test signal pad 151b and the second test signal pad 141b so that the gate driving part 160 and the pixels are protected against static charge that might otherwise be applied through the first extended portion 151a and the second extended portion 141a.

The gate driving part 160 and the integrated pad part 170 may be formed from substantially the same layers as the pixels, the signal transmission line 155, the first test signal input part 151 and the second test signal input part 141.

Alternatively, the test pad region TA may be disconnected along the trimming line TL after subsequent processes.

According to the method of manufacturing the display substrate of FIGS. 6 to 15, the display substrate is irradiated by the laser beam along the trimming line TL so that the first extended portion 151a and the second extended portion 141a may be disconnected from the first test signal pad 151b and the second test signal pad 141b.

In addition, the semiconductor pattern 137 and the second contact hole 152 are formed using substantially the same mask 139. Thus, a manufacturing process of the display substrate is simplified, and a manufacturing cost of the display substrate is decreased.

Figure 16:
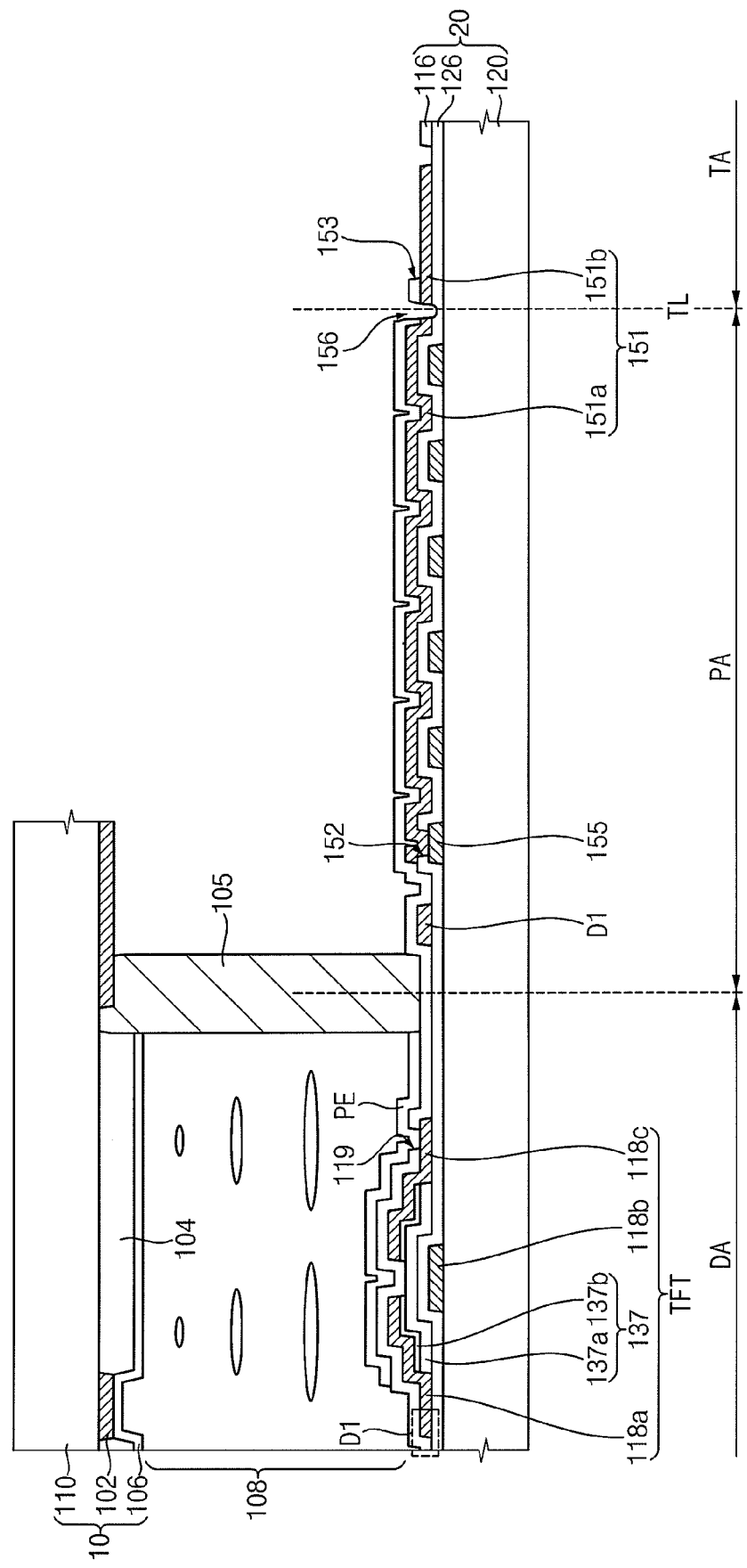
FIG. 16 is a cross-sectional view illustrating a display device in accordance with another exemplary embodiment of the present invention.

FIG. 16 is a cross-sectional view illustrating a display device in accordance with another exemplary embodiment of the present invention.

Referring to FIG. 16, the display device includes a display substrate 20, an opposite substrate 10 and a liquid crystal layer 108.

The display substrate 20 of FIG. 16 is the same as the display substrate in FIGS. 1, 2, 3 and 15. Thus, the same reference numerals may be used to refer to the same or like parts as those described in FIGS. 1, 2, 3 and 15.

The opposite substrate 10 faces the display substrate 20, and includes an opposite insulating substrate 110, a black matrix 102, a color filter 104 and a common electrode 106.

The opposite insulating substrate 110 includes glass that transmits light. Alternatively, the opposite insulating substrate 110 may include a transparent synthetic resin.

The black matrix 102 is formed on the opposite insulating substrate 110 to block light. In FIG. 16, the black matrix 102 is formed in a region corresponding to a plurality of gate lines G1, . . . , Gn and a plurality of data lines D1, . . . , Dm and a peripheral region PA.

The color filter 104 is formed on the opposite insulating substrate 110 on which the black matrix 102 is formed to transmit light having a predetermined wavelength. The color filter 104 corresponds to a plurality of pixels.

The common electrode 106 is formed on the opposite insulating substrate 110 on which the black matrix 102 and the color filter 104 are formed. The common electrode 106 includes a transparent conductive material. Examples of the transparent conductive material that can be used for the common electrode 106 include indium tin oxide (ITO), indium zinc oxide (IZO), etc.

A spacer (not shown) may be interposed between the display substrate 20 and the opposite substrate 10 to maintain a distance between the display substrate 20 and the opposite substrate 10.

The liquid crystal layer 108 is interposed between the display substrate 20 and the opposite substrate 10. Liquid crystals of the liquid crystal layer 108 vary arrangement in response to an electric field applied between the common electrode 106 and a pixel electrode PE. Thus, light transmittance of the liquid crystal layer 108 is changed to display an image.

A sealant 105 seals the liquid crystal layer 108 between the display substrate 20 and the opposite substrate 10.

According to the display device of FIG. 16, the display substrate 20 includes a first extended portion 151a electrically connected to a signal transmission line 155 through a second contact hole 152 of a gate insulating layer 126. The first extended potion extends toward a side of an insulating substrate 120. The display substrate further includes a first test signal input part 151 having a test signal pad 151b electrically connected to the first extended portion 151a. Thus, defects caused by an externally provided static charge are decreased.

Figure 17:
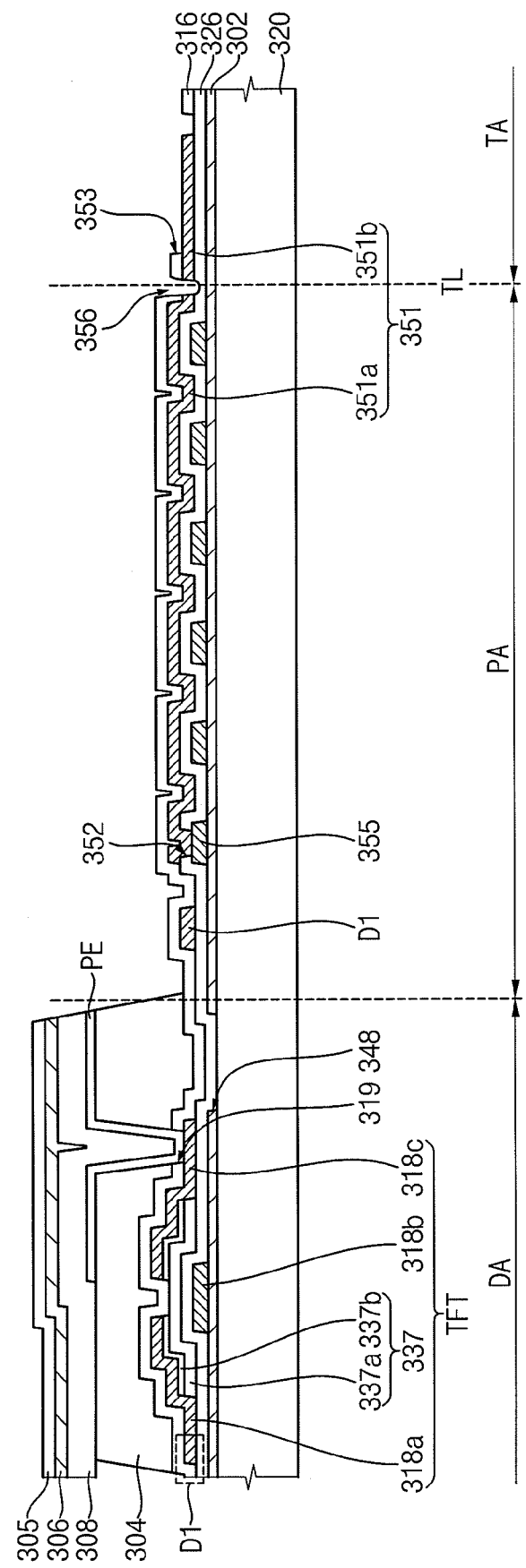
FIG. 17 is a cross-sectional view illustrating a display device in accordance with another exemplary embodiment of the present invention.

FIG. 17 is a cross-sectional view illustrating a display device in accordance with another exemplary embodiment of the present invention.

Referring to FIG. 17, the display device includes an insulating substrate 320, a black matrix 302, a driving transistor TFT, a switching transistor (not shown), a gate line (not shown), a data line D1, a driving line (not shown), a gate insulating layer 326, a passivation layer 316, a signal transmission line 355, a first test signal input part 351, a second test signal input part (not shown), a color filter 304, a pixel electrode PE, an organic light emitting layer 308, a common electrode 306 and a passivation layer 305.

The display device includes a pixel region DA, a peripheral region PA and a test pad region TA. The driving transistor TFT, the switching transistor, the gate line, the data line D1, the driving line, the color filter 304, the organic light emitting layer 308 and the common electrode 306 are formed in the pixel region DA. The signal transmission line 355, a first extended portion 351a of the first test signal input part 351 and a second extended portion (not shown) of the second test signal input part are formed in the peripheral region PA. A first test signal pad 351b of the first test signal input part 351 and a second test signal pad (not shown) of the second test signal input part are formed in the test pad region TA.

The insulating substrate 320 includes glass that transmits light. Alternatively, the insulating substrate 320 may include transparent synthetic resin.

The black matrix 302 is formed on the insulating substrate 320 to define a plurality of openings 348 arranged in a matrix shape.

The switching transistor is formed on the black matrix 302. The switching transistor is electrically connected to the gate line and the data line D1. The switching transistor applies a data signal from the data line to the driving transistor TFT as a switching signal.

The driving transistor TFT is formed on the black matrix 302. The driving transistor TFT is electrically connected to the driving line. The driving transistor TFT applies a driving current to the pixel electrode PE based on the switching signal.

The driving transistor TFT includes a gate electrode 318b, a source electrode 318a, a drain electrode 318c and a semiconductor pattern 337. The gate electrode 318b is electrically connected to the switching transistor to receive the switching signal. The source electrode 318a is electrically connected to the data line D1. The drain electrode 318c is electrically connected to the pixel electrode PE. Alternatively, a drain electrode of the driving transistor may be electrically connected to the data line D1, and a source electrode of the driving transistor may be electrically connected to the pixel electrode PE.

The semiconductor pattern 337 includes an amorphous silicon pattern 337a and an N+ amorphous silicon pattern 337b.

The signal transmission line 355 is formed on the black matrix 302.

The first extended portion 351a is electrically connected to the signal transmission line 355 through a second contact hole 352 of the gate insulating layer 326.

The passivation layer 316 is formed on the gate insulating layer 326 on which the driving transistor TFT, the switching transistor, the driving line, the data line, the first test signal input part 351 and the second test signal input part are formed. The passivation layer 316 has a first contact hole 319 through which the drain electrode 318c of the driving transistor is partially exposed, a third contact hole through which the first test signal pad 351b is exposed, and a fourth contact hole (not shown) through which the second test signal pad is exposed.

The color filter 304 is formed on the passivation layer 316 in the pixel region DA, and partially exposes the drain electrode 318c.

The pixel electrode PE is electrically connected to the drain electrode 318c through the first contact hole 319, and covers each of the openings 348 of the black matrix 302.

The organic light emitting layer 308 is formed on the color filter 304 on which the pixel electrode PE is formed.

The common electrode 306 is formed on the organic light emitting layer 308.

The passivation layer 305 is formed on the organic light emitting layer 308.

In order to test the display device, a plurality of first test signals is applied to the first test signal pad 351b, and a plurality of second test signals is applied to the second test signal pad.

After the test is completed, the display device is irradiated by a trimming laser (not shown) to form a disconnecting portion 156 along the trimming line. Therefore, the first test signal pad 351b and the second test signal pad are electrically disconnected from the signal transmission line 355 and the data lines D1.

According to the display device of FIG. 17, the display device is protected from an externally provided static charge.

Figure 18:
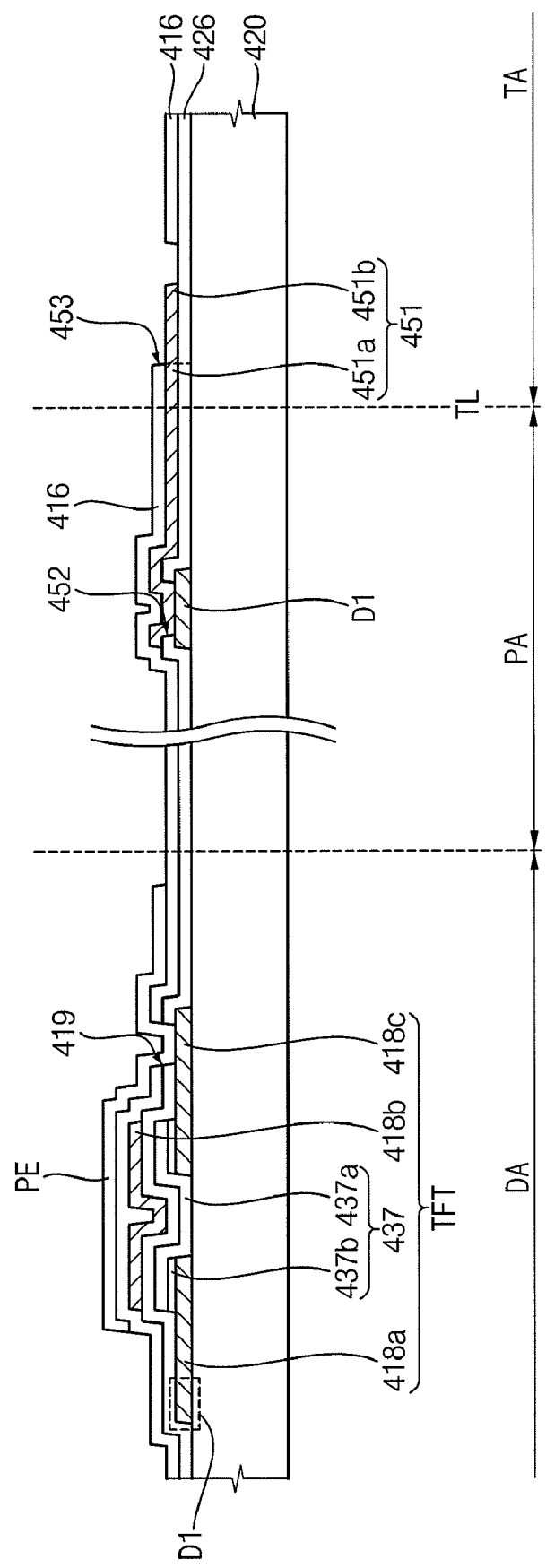
FIG. 18 is a cross-sectional view illustrating a display substrate in accordance with another exemplary embodiment of the present invention.

FIG. 18 is a cross-sectional view illustrating a display substrate in accordance with another exemplary embodiment of the present invention.

Referring to FIG. 18, the display substrate includes an insulating substrate 420, a thin film transistor TFT, a gate line (not shown), a data line D1, a first test signal input part 451, a second test signal input part (not shown), a gate insulating layer 426, a passivation layer 416 and a pixel electrode PE. Alternatively, the display substrate may further include a gate driving part (not shown).

The thin film transistor TFT includes a gate electrode 418b, the gate insulating layer 426, a semiconductor pattern 437, a source electrode 418a and a drain electrode 418c.

The source electrode 418a is formed on the insulating substrate 420, and is electrically connected to the data line D1.

The drain electrode 418c is formed on the insulating substrate 420. The drain electrode 418c is electrically connected to the pixel electrode PE through a first contact hole 419 that is formed through the gate insulating layer 426 and the passivation layer 416.

The semiconductor pattern 437 includes an amorphous silicon pattern 437a and an N+ amorphous silicon pattern 437b. The N+ amorphous silicon pattern 437b includes two patterns spaced apart from each other on the source electrode 418a and the drain electrode 418c. The amorphous silicon pattern 437a is formed on the N+ amorphous silicon pattern 437b and the insulating substrate 420.

The gate insulating layer 416 is formed on the semiconductor pattern 437, the source electrode 418a, the drain electrode 418c and the data line D1.

The gate electrode 418b is formed on the gate insulating layer 426 corresponding to the semiconductor pattern 437. The gate electrode 418b is electrically connected to the gate line.

The gate insulating layer 426 covers the gate electrode 418b and the gate line so that the gate electrode 418b and the gate line are electrically insulated from the semiconductor pattern 437, the source electrode 418a and the drain electrode 418c. In FIG. 18, the gate insulating layer 426 includes an insulating material that transmits light. Examples of the insulating material that can be used for the gate insulating layer 426 include silicon nitride, silicon oxide, etc.

The first test signal input part 451 includes a first extended portion 451a and a first test signal pad 451b. The first extended portion 451a is formed in a peripheral region PA. The first test signal pad 451b is formed in a test pad region TA, and is electrically connected to the first extended portion 451a. The first extended portion 451a is electrically connected to the data line D1 through a second contact hole 452 that is formed in the gate insulating layer 426. The first test signal pad 451b is exposed through a third contact hole 453 that is formed in the passivation layer 416. The first test signal input part 451 is formed from substantially the same layer as the gate electrode 418b.

According to the display substrate of FIG. 18, a portion of the first extended portion 451a that is electrically connected to the data line D1 is irradiated by the laser beam through the second contact hole 452 so that the first test signal input part 451 may be disconnected, thereby protecting the display substrate from an externally provided static charge.

According to an exemplary embodiment of the present invention, the test signal input part is formed on the gate insulating layer to be disconnected by the laser trimming.

Therefore, the display substrate may be protected from the static charge so that defects of the display substrate may be decreased.

This disclosure has been described with reference to the exemplary embodiments. Many alternative modifications and variations will be apparent to those having skill in the art in light of the foregoing description. Accordingly, the present disclosure embraces all such alternative modifications and variations.

What is claimed is:

1. A method of manufacturing a display substrate, comprising:
    forming a signal transmission line that transmits an image signal to a switching element on an insulating substrate;
    forming a first insulating layer on the insulating substrate to cover the signal transmission line, the first insulating layer having a contact hole through which the signal transmission line is partially exposed;
    forming a test signal pad having an extended portion on the first insulating layer, the extended portion electrically and directly connected to the signal transmission line through the contact hole, the extended portion being extended in a direction toward an inner portion of the surface area of the insulating substrate, the test signal pad and the extended portion being formed from a same conductive layer;
    testing the switching element and the signal transmission line by applying a test signal to the test signal pad; and
    disconnecting the test signal pad from the signal transmission line by irradiating the extended portion adjacent to the test signal pad with a laser beam.

2. The method of claim 1, further comprising forming a second insulating layer having a pixel contact hole and a pad contact hole on the first insulating layer, the switching element being partially exposed through the pixel contact hole, the test signal pad being partially exposed through the pad contact hole.

3. The method of claim 2, further comprising:
    forming a transparent conductive layer on the second insulating layer on which the test signal pad is formed; and
    partially etching the transparent conductive layer to form a pixel electrode electrically connected to the switching element through the pixel contact hole and a cover pattern that covers the test signal pad exposed through the pad contact hole.

4. The method of claim 1, wherein the signal transmission line and a gate electrode of the switching element are fanned substantially from a first common layer.

5. The method of claim 4, wherein the test signal pad and a source electrode and a drain electrode of the switching element are formed substantially from a second common layer.

6. The method of claim 5, wherein the test signal pad comprises a metal.

7. The method of claim 4, further comprising forming a signal transmission pad and the signal transmission line from the first common layer, the signal transmission pad being electrically connected to an end portion of the signal transmission line.

* * * * *